R. B. WILLIAMSON.
DYNAMO ELECTRIC MACHINE.
APPLICATION FILED APR. 17, 1909.

976,420.

Patented Nov. 22, 1910.

Witnesses
Rob. E. Still
Chas. L. Byron

Inventor
Robert B. Williamson
By Chas. E. Lord
Attorney.

UNITED STATES PATENT OFFICE.

ROBERT B. WILLIAMSON, OF MILWAUKEE, WISCONSIN, ASSIGNOR TO ALLIS-CHALMERS COMPANY, A CORPORATION OF NEW JERSEY.

DYNAMO-ELECTRIC MACHINE.

976,420.

Specification of Letters Patent. Patented Nov. 22, 1910.

Application filed April 17, 1909. Serial No. 490,627.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines, and particularly to high speed machines such as turbo-alternators, which are inclosed in casings or housings and are cooled by forced circulation of air which passes through the stationary element of a machine in parallel planes and from one side thereof to the other, the air generally passing upwardly from the bottom of the machine to the top where exhaust openings are provided.

One of the objects of the invention is the provision of means whereby there will be a good circulation of air between the stator core and the surrounding housing so that the outer periphery of the core will be cooled and the possibility for dead air between the core and the housing, and particularly between the radial bracing ribs of the housing, will be eliminated.

A still further object is a provision of means whereby the relative amounts or volumes of air which pass through the stator core and between the stator core and housing respectively, may be readily varied, and also whereby the amounts of air permitted to pass through different parts of the annular space between the stator core and housing may be regulated or adjusted.

My invention may be briefly summarized as consisting in certain novel details of construction and combinations and arrangements of parts which will be described in the specification and set forth in the appended claims.

Figure 1:
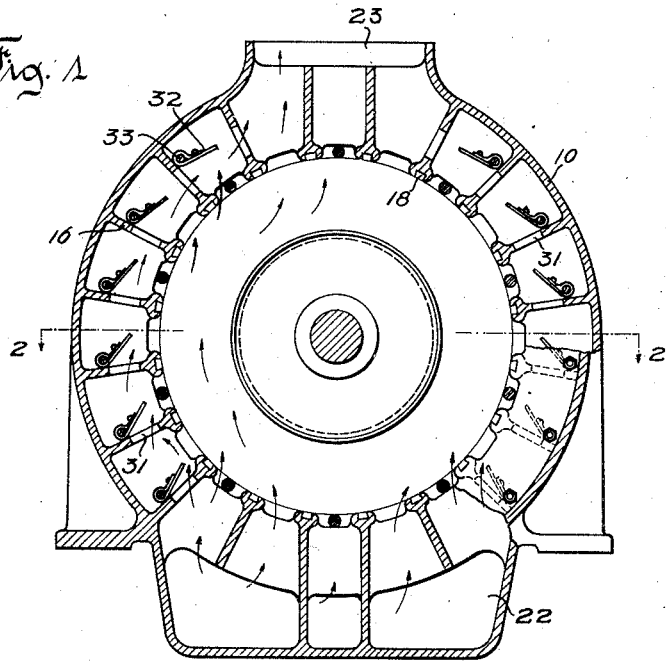
Figure 2:
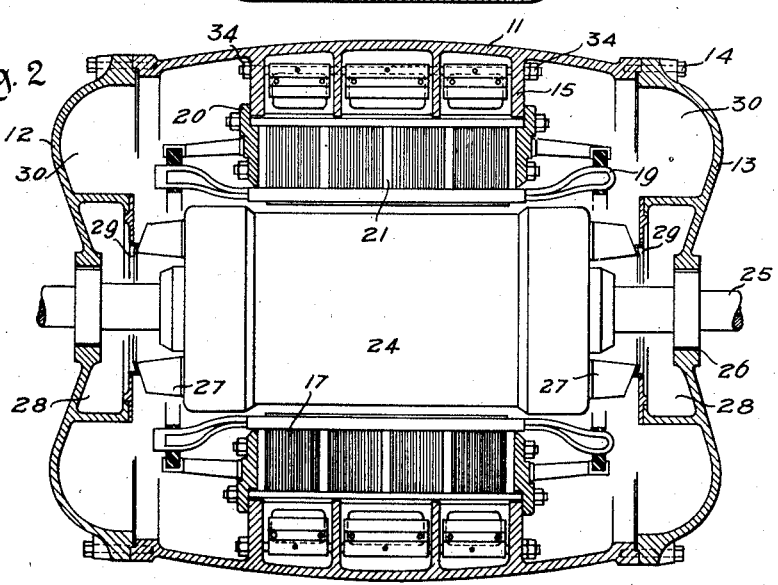

In the accompanying sheet of drawings, Figure 1 is a vertical transverse sectional view taken through the stationary element of a dynamo-electric machine constructed in accordance with my invention, the rotor being here shown in elevation; and, Fig. 2 is a longitudinal sectional view taken substantially along the line 2—2 of Fig. 1, the rotor being again shown in elevation.

Referring now to the figures of the drawing, 10 represents the housing or casing of a turbo-alternator, said casing consisting of a middle portion 11 and end portions 12 and 13 which are secured to the middle portion by bolts 14. The portion 11 of the housing is provided on the interior with a number of annular ribs 15 arranged at intervals axially and in parallel vertical planes, and with a number of transverse radial ribs 16 spaced circumferentially and intersecting the annular ribs 15. These annular and radial ribs serve to strengthen and brace the housing and to support the annular stator core 17 which is secured to the ribs preferably by dove-tail connections 18 and which carries the usual stator winding 19. The core consists of laminæ or sheet metal punchings which are clamped between end plates 20 and are arranged in groups which are spaced apart, forming axially spaced annular or circumferential ventilating passageways 21, through which the air passes in a manner to be explained presently.

The housing 10 is provided at the bottom or below the stator core with an air receiving chamber 22, and at the top with a chimney or large exhaust opening or openings 23, the chamber 22 and the chimney 23 communicating with the different circumferential passageways 21 so that the air may pass from the chamber 22 upwardly through the passageways 21 and may escape through the chimney 23.

At 24 is shown the rotary member or rotor of the machine, which rotor is mounted upon a shaft 25 extending outwardly through shaft openings 26 provided in the end portions 12 and 13 of the housing. On the ends of the rotor 24 are secured fan blades or blowers 27 which are adapted to draw air through air supplying conduits 28 which are formed in the end portions 12 and 13 of the housing and preferably extend upward from the bottom of the machine in a well known manner and are provided around the shaft adjacent to the blowers 27 with annular openings 29 through which air is drawn by the blowers when the machine is in operation. At the ends of the housing on both sides of the stator core are large annular air chambers 30 which communicate with the air receiving chamber 22 at the bottom of the housing and receive air directly from the blowers. It will be apparent from the construction so far described, that air will be drawn by the blowers through the conduits 28 into the chambers 30 and will thence be forced into the chamber 22 from which the air may pass upwardly through the core and escape through the chimney 23.

Inasmuch as the rotor of a turbo alternator is usually driven at exceedingly high speeds, the rotor core has considerable blower action and tends to force air radially into the circumferential air passageways 21 of the stator core. In order to prevent heated air from becoming caught or pocketed by the radial ribs 16 between the housing and the stator core, and in order that the outer periphery of the stator core may be subjected to cooling air currents, I provide the radial ribs 16 which are located between the air chamber 22 and the chimney 23 or between the annular portion of the housing and the stator core, with ventilating openings 31 so that air may not only pass upwardly from the chamber 22 through the stator core, but may also pass upwardly and between the housing and stator core on both sides of the rotor. These openings, as will be seen from Fig. 2, are located between the annular ribs 15. In order that the relative quantities or volumes of air passing through the core and through the spaces or passageways between the housing and the core may be readily adjusted, I provide for these different ventilating openings 31 in the ribs, adjustable dampers or valves 32, which in this case are secured to rods 33 extending through the annular ribs 15 near the outer portions thereof. These rods, each of which in this instance carries three dampers, and which may be turned to adjust the positions of the dampers and the effective sizes of the openings 31, are clamped or held in any desired adjusted positions by means of nuts 34 on the outer ends of the rods and engaging the outer annular ribs 15. Inasmuch as the frictional resistance, and the air velocities vary in different parts of the machine, I have here shown these dampers as being opened different amounts, and since the air pressure is greater at the lower part of the machine than at the upper part the dampers, from the lowermost to the uppermost are preferably, as shown in this case, arranged at successively greater angles with respect to the corresponding ribs so as to provide successively larger openings through which the air may pass. After it has once been determined to what extent the different dampers shall be opened to produce the best cooling effects, the positions of the dampers will be fixed by tightening the nuts 34.

It is to be noted that with the present construction, the air as it passes through the ventilating openings 31 will be deflected by the dampers toward and against the outer portion of the stator core so as to have the greatest possible cooling effect on the latter. It is to be noted also that with the construction which I have provided not only can the relative volumes of air passing from the air chamber 22 through the core and between the core and housing be readily adjusted, but inasmuch as the sets of dampers on the rods are independently adjustable, the effective openings in the ribs in any particular part of the machine may be varied.

I do not desire to be confined to the exact details shown and described, but aim in my claims to cover all modifications which do not involve a departure from the spirit and scope of my invention.

What I claim as new is:—

1. In a dynamo-electric machine, the combination of a closed housing having transverse ribs and provided with an exhaust opening, a core supported by said ribs and provided with ventilating passageways, said ribs having ventilating openings and dampers for varying the effective sizes of the openings, and means for causing a flow of air through said ventilating passageways and openings and out through the exhaust opening.

2. In a dynamo-electric machine, the combination of a stator and rotor, said stator comprising a housing having transverse ribs and a core supported thereby, said ribs having ventilating openings and dampers for regulating the effective sizes of said ventilating openings, said rotor being provided with means for forcing air through said ventilating openings.

3. In a dynamo-electric machine, the combination of a stator and rotor, said stator comprising a housing having sets of ribs and a core supported thereby, said ribs having ventilating openings, separately adjustable dampers for varying the effective sizes of said openings in said sets of ribs, and blowers on said rotor for causing a flow of air through said ventilating openings to cool said stator core.

4. In a dynamo-electric machine, the combination of a stator and rotor, said stator comprising a housing having ribs and a core supported thereby, said ribs having ventilating openings, means between the stator housing and core for varying the effective sizes of said openings, and blowers on said rotor for causing currents of air to be forced through said openings to cool said stator core.

5. In combination, a closed housing, having inwardly extending transverse ribs spaced circumferentially and provided at the top with an air exhaust opening, an annular stator core supported by said ribs and provided with circumferential ventilating passageways, a rotor, means for forcing the air upwardly from the bottom of the core to said exhaust opening at the top of the housing, said ribs having ventilating openings whereby part of the air will pass upwardly between the core and housing through the openings in the ribs and part will pass through the ventilating passageways of the core, and means on said ribs for regulating the relative amounts of air which pass through the core and between the core and frame.

6. In combination, a closed housing having inwardly extending transverse ribs spaced circumferentially and provided at the top with an air exhaust opening, an annular stator core supported by said ribs and provided with circumferential ventilating passageways, a rotor, means for forcing the air upwardly from the bottom of the core to said exhaust opening at the top of the housing, said ribs having ventilating openings whereby part of the air will pass upwardly between the core and housing through the openings in the ribs and part will pass through the ventilating passageways of the core, and adjustable dampers for the openings in the different ribs so that the quantity of air passing through the openings may be varied.

7. In combination, a closed housing having inwardly extending annular ribs spaced axially, and transverse radial ribs spaced circumferentially and intersecting the annular ribs, and said housing having at the bottom an air receiving chamber and at the top an air exhaust opening, an annular stator core supported by said ribs and having axially spaced circumferential ventilating passageways, a rotor, the radial ribs located on both sides of the rotor between the air receiving chamber and the exhaust opening having between the annular ribs ventilating openings, means carried by said rotor for forcing air into said chamber and thence upwardly in parallel planes through the stator core and between the core and housing through the ventilating ribs on both sides of the rotor to the exhaust opening at the top of the housing, and dampers for said openings, said dampers serving to deflect the air passing through the openings toward the core, and providing means for adjusting the relative amounts of air which pass through the core and between the core and housing.

8. In combination, a closed housing having inwardly extending transverse ribs spaced circumferentially and having at the bottom an air receiving chamber and at the top an exhaust opening, the ribs between the chamber and exhaust openings having ventilating openings, an annular stator core supported by said ribs and provided with axially spaced circumferential ventilating passageways, a rotor, means for forcing the air into said chamber and thence upwardly through the passageways in the core and between the core and the housing on both sides of the rotor, dampers for said openings in the ribs, and rods extending along said ribs and carrying said dampers.

9. In combination, a closed housing having inwardly extending transverse ribs spaced circumferentially and provided at the bottom with an air receiving chamber and at the top with exhaust openings, the ribs between the chamber and exhaust openings having ventilating openings, an annular stator core supported by said ribs and provided with axially spaced circumferential ventilating passageways, a rotor, means for forcing the air into said chamber and thence upwardly through the passageways in the core and between the core and the housing on both sides of the rotor, dampers for the openings in said ribs, and axial rods extending along said ribs near the outer portion thereof and carrying said dampers, said rods being adjustable and supporting the dampers so that the latter deflect air toward the core.

10. In combination, a housing having inwardly extending annular ribs spaced axially and transverse ribs spaced circumferentially and intersecting the annular ribs, and said housing having at the bottom an air chamber and at the top an air exhaust opening, said circumferentially spaced ribs between the air chamber and the exhaust opening at the top of the housing having ventilating openings, an annular stator core supported by said ribs and having circumferential ventilating passageways spaced axially, a rotor, means carried by said rotor for forcing the air into said chamber and thence upwardly in parallel planes through said ventilating passageways in the stator core and between the core and the housing on both sides of the rotor, and means causing the effective openings in the ribs to be successively larger from the air chamber to the exhaust opening.

In testimony whereof I affix my signature, in the presence of two witnesses.

ROBERT B. WILLIAMSON.

Witnesses:
H. C. CASE,
CHAS. L. BYRON.